(12) United States Patent
Carpenter et al.

(10) Patent No.: US 12,409,599 B2
(45) Date of Patent: Sep. 9, 2025

(54) CONTAINER PREFORM AND FORMING/FILLING NOZZLE EACH CONFIGURED TO PROVIDE A SEAL THEREBETWEEN

(71) Applicant: LIQUIFORM GROUP LLC, Saline, MI (US)

(72) Inventors: Gregory Carpenter, Ann Arbor, MI (US); Kirk Edward Maki, Tecumseh, MI (US); Jonathan McGurk, Toledo, OH (US)

(73) Assignee: LiquiForm Group LLC, Saline, MI (US)

(*) Notice: Subject to any disclaimer, the term of this patent is extended or adjusted under 35 U.S.C. 154(b) by 127 days.

(21) Appl. No.: 17/797,426

(22) PCT Filed: Feb. 14, 2020

(86) PCT No.: PCT/US2020/018231
§ 371 (c)(1),
(2) Date: Aug. 3, 2022

(87) PCT Pub. No.: WO2021/147531
PCT Pub. Date: Aug. 19, 2021

(65) Prior Publication Data
US 2023/0089579 A1 Mar. 23, 2023

(51) Int. Cl.
*B29C 49/58* (2006.01)
*B29C 49/12* (2006.01)
(Continued)

(52) U.S. Cl.
CPC ............. *B29C 49/58* (2013.01); *B29C 49/12* (2013.01); *B29C 2049/4664* (2013.01); *B29L 2031/712* (2013.01)

(58) Field of Classification Search
CPC ......... B29C 49/58; B29C 49/06; B29C 49/46; B29C 49/12; B29C 45/17; B29C 2049/4664
See application file for complete search history.

(56) References Cited

U.S. PATENT DOCUMENTS 6,214,282 B1 4/2001 Katou et al.
6,464,486 B1 10/2002 Barray et al.
(Continued)

FOREIGN PATENT DOCUMENTS

WO 2017078773 * 5/2017 ............. B29C 49/46
WO 2019150754 * 8/2019 ............. B29C 49/46

*Primary Examiner* — Alison L Hindenlang
*Assistant Examiner* — Shibin Liang
(74) *Attorney, Agent, or Firm* — Honigman LLP; Eric J. Sosenko; Jonathan P. O'Brien

(57) ABSTRACT

A system for simultaneously forming a container and filling the container with a product. The system includes a thermoplastic preform and a nozzle. The preform is configured to be molded into the container. The nozzle is for a forming/filling head configured to inject the product into the preform sealed to the nozzle for simultaneously forming the container from the preform and filling the container with the product. Upon insertion of a finish of the preform between an outer flange and an inner flange of the nozzle, the finish seals to the nozzle through cooperation between: a brim of the preform and an upper sealing surface of the nozzle between the outer flange and the inner flange; a sealing ledge of the finish and a lower sealing surface of the inner flange; and an inner sealing sidewall of the finish and an outer sealing surface of the inner flange.

13 Claims, 6 Drawing Sheets

(51) Int. Cl.
 *B29C 49/46* (2006.01)
 *B29L 31/00* (2006.01)

(56) References Cited

U.S. PATENT DOCUMENTS

| | | | |
|---|---|---|---|
| 7,914,726 B2 | 3/2011 | Andison et al. | |
| 8,017,064 B2 | 9/2011 | Andison et al. | |
| 8,435,026 B2 | 5/2013 | Andison et al. | |
| 8,573,964 B2 | 11/2013 | Andison et al. | |
| 2013/0216748 A1* | 8/2013 | Siegl | B29C 49/04 |
| | | | 428/36.6 |
| 2015/0190975 A1 | 7/2015 | Yokobayashi et al. | |
| 2015/0338024 A1 | 11/2015 | Iwata | |
| 2016/0107367 A1 | 4/2016 | Maki et al. | |
| 2018/0043606 A1* | 2/2018 | Morikami | B29C 49/12 |
| 2019/0168438 A1* | 6/2019 | Morikami | B29C 49/06 |
| 2019/0248062 A1* | 8/2019 | Shiokawa | B29C 49/28 |
| 2020/0047395 A1* | 2/2020 | Okuyama | B29C 49/12 |

\* cited by examiner

CONTAINER PREFORM AND FORMING/FILLING NOZZLE EACH CONFIGURED TO PROVIDE A SEAL THEREBETWEEN

FIELD

The present disclosure relates to a container preform and a forming/filling nozzle each configured to provide a seal therebetween that prevents leakage of liquid injected through the nozzle and into the preform during simultaneous forming and filling of a container from the preform.

BACKGROUND

This section provides background information related to the present disclosure, which is not necessarily prior art.

Polymeric containers are used to store various types of food and beverages. Such containers are typically formed from a preform using various processes. One such process involves simultaneously forming the container from a preform and filling the container with any suitable product. This process is commonly referred to as Liquiform®. To simultaneously form and fill the container, a forming/filling head is placed into cooperation with a finish of the preform.

While current Liquiform® heads are suitable for their intended use, they are subject to improvement. For example, with larger sized finishes, such as 48 mm, the standard Liquiform® seal between the head and the preform tends to leak. The present disclosure advantageously provides for a seal between a nozzle for a Liquiform® forming/filling head and a preform finish. One skilled in the art will appreciate that the present disclosure provides numerous additional advantages and unexpected results as well.

SUMMARY

This section provides a general summary of the disclosure, and is not a comprehensive disclosure of its full scope or all of its features.

The present disclosure includes a nozzle for a forming/filling head configured to inject a product into a preform sealed to the nozzle for simultaneously forming a container from the preform and filling the container with the product. The nozzle includes: an outer flange at an outlet of the nozzle; an inner flange surrounded by the outer flange, the inner flange including an outer sealing surface facing the outer flange, an inner surface opposite to the outer surface, and a lower sealing surface; and an upper sealing surface between the outer flange and the inner flange. Upon insertion of a finish of the preform between the outer flange and the inner flange, the nozzle seals to the preform through cooperation between: the upper sealing surface and a brim of the preform; the lower sealing surface and a sealing ledge of the preform; and the outer sealing surface and an inner sealing sidewall of the preform.

The present disclosure further includes a preform configured to seal against a nozzle of a forming/filling head for injecting a product into the preform to simultaneously form a container from the preform and fill the container with the product. A finish of the preform includes: a brim defining an opening; threads at an outer surface of the finish, the threads configured to cooperate with a closure; a sealing ledge at an inner surface of the preform, the inner surface is opposite to the outer surface; and an inner sealing sidewall extending between the sealing ledge and the brim. Upon insertion of the finish between an outer flange and an inner flange of the nozzle, the finish seals to the nozzle through cooperation between: the brim and an upper sealing surface of the nozzle between the outer flange and the inner flange; the sealing ledge of the finish and a lower sealing surface of the inner flange of the nozzle; and the inner sealing sidewall of the finish and an outer sealing surface of the inner flange of the nozzle.

The present disclosure also includes a system for simultaneously forming a container and filling the container with a product. The system includes a preform and a nozzle. The preform is configured to be molded into the container. The nozzle is for a forming/filling head configured to inject the product into the preform sealed to the nozzle for simultaneously forming the container from the preform and filling the container with the product. Upon insertion of a finish of the preform between an outer flange and an inner flange of the nozzle, the finish seals to the nozzle through cooperation between: a brim of the preform and an upper sealing surface of the nozzle between the outer flange and the inner flange; a sealing ledge of the finish and a lower sealing surface of the inner flange; and an inner sealing sidewall of the finish and an outer sealing surface of the inner flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
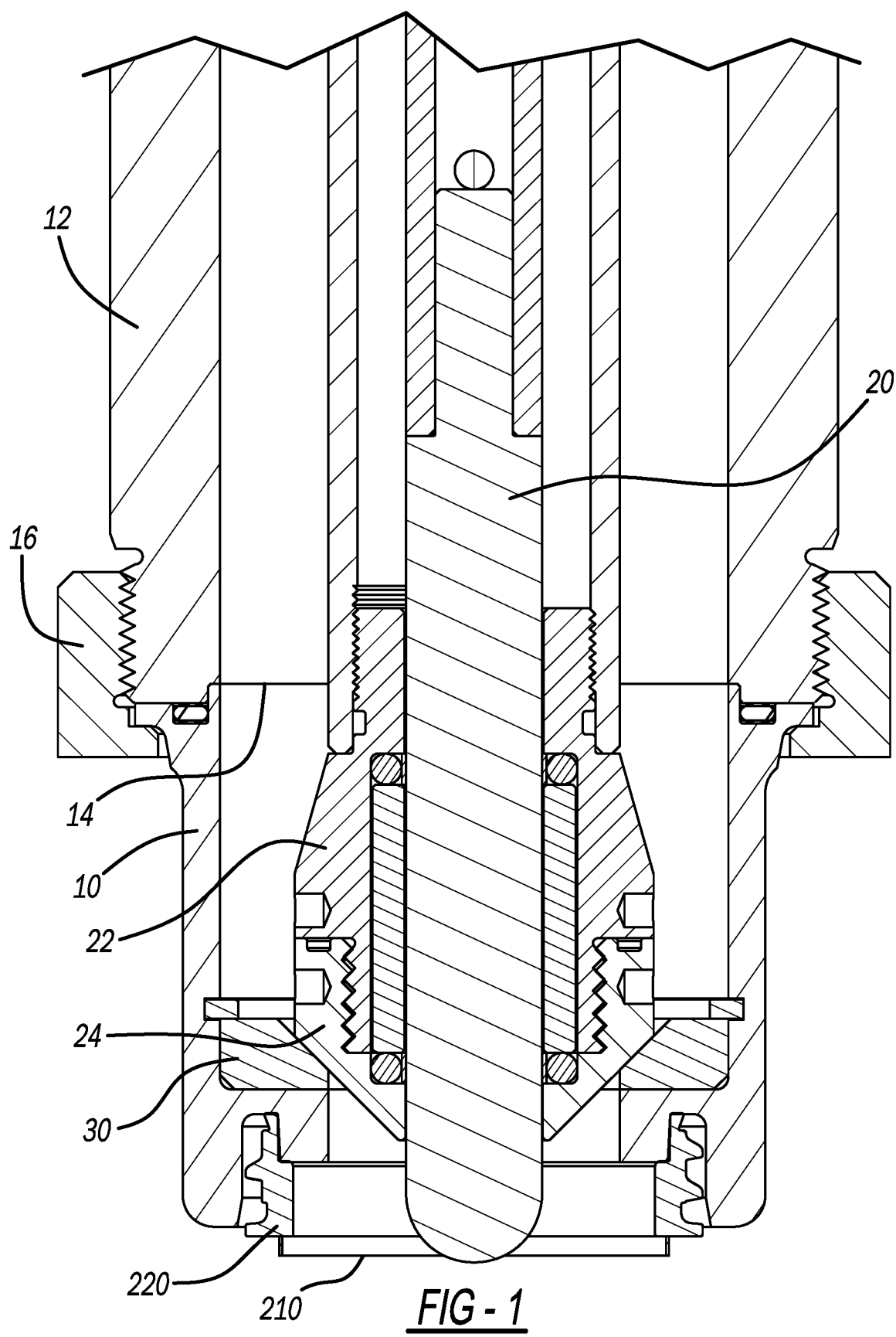
FIG. 1 is a cross-sectional view of cooperation between a container preform finish and a nozzle of a forming/filling head in accordance with the present disclosure for simultaneously forming a container from the preform and filling the container.

FIG. 1 illustrates a nozzle 10 in accordance with the present disclosure for use with any suitable machine head for simultaneously forming and filling a polymeric container from a container preform 210. The preform 210 and the resulting container can be formed of any suitable polymeric material, such as polyethylene terephthalate (PET), low-density polyethylene (LDPE), high-density polyethylene (HDPE), polypropylene (PP), polystyrene, and the like, for example. An exemplary forming and filling head is illustrated at reference numeral 12. The forming and filling head 12 is configured for use with any suitable Liquiform® machine, for example, such as described in the following U.S. Pat. Nos., each of which is incorporated herein by reference: U.S. Pat. Nos. 7,914,726; 8,017,064; 8,435,026; and 8,573,964.

The nozzle 10 is secured to an outlet 14 of the forming and filling head 12 in any suitable manner, such as with a coupling member 16. With the nozzle 10 secured to the head 12, and the preform 210 sealed to the nozzle 10, any suitable product can be injected from the head 12 into the preform 210 by way of the nozzle 10 to simultaneously form a container from the preform 210 and fill the container with the product. Suitable products include, but are not limited to, water, sports drinks, juice, sauces, any suitable foodstuffs, etc. To facilitate forming of the container, a stretch rod 20 extends from the head 12 through the nozzle 10 and into the preform 210. The stretch rod 20 extends through a nozzle plug 22, which includes a seal 24 for sealing against nozzle seal 30 of the nozzle 10.

With continued reference to FIG. 1, and additional reference to FIG. 2, the nozzle 10 will now be described in additional detail. The nozzle 10 includes an inlet or upper end 50, which is opposite to an outlet or lower end 52. Extending from the inlet end 50 is an upper sidewall 60, which defines an upstream portion 62 of an aperture extending through the nozzle 10 from the inlet end 50 to the outlet end 52.

At the outlet end 52 is an outer flange 70. The outer flange 70 is an annular flange (see FIG. 3) having an inner surface 72, which defines a downstream portion 74 of the aperture extending through the nozzle 10. The outer flange 70 surrounds and is spaced apart from an inner flange 80.

Figure 3:
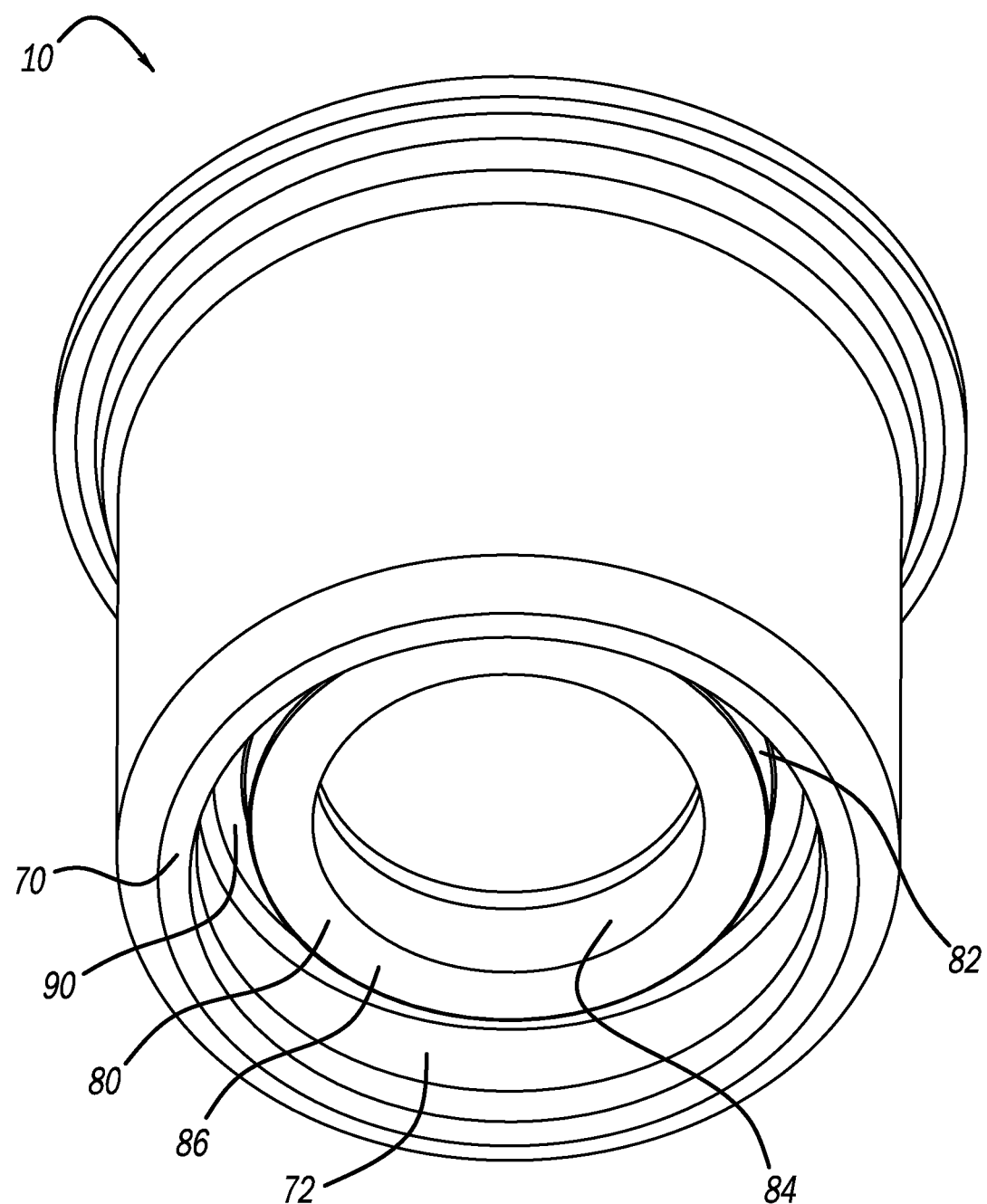
FIG. 3 is a perspective view of an undersurface of the nozzle of FIG. 1.

The inner flange 80 is an annular flange (see FIG. 3). The inner flange 80 includes an outer sealing surface 82, an inner surface 84, and a lower sealing surface 86. The inner surface 84 defines an intermediate portion 88 of the aperture extending through the nozzle 10. Extending between the outer sealing surface 82 of the inner flange 80 and the inner surface 72 of the outer flange 70 is an upper sealing surface 90.

Figure 2:
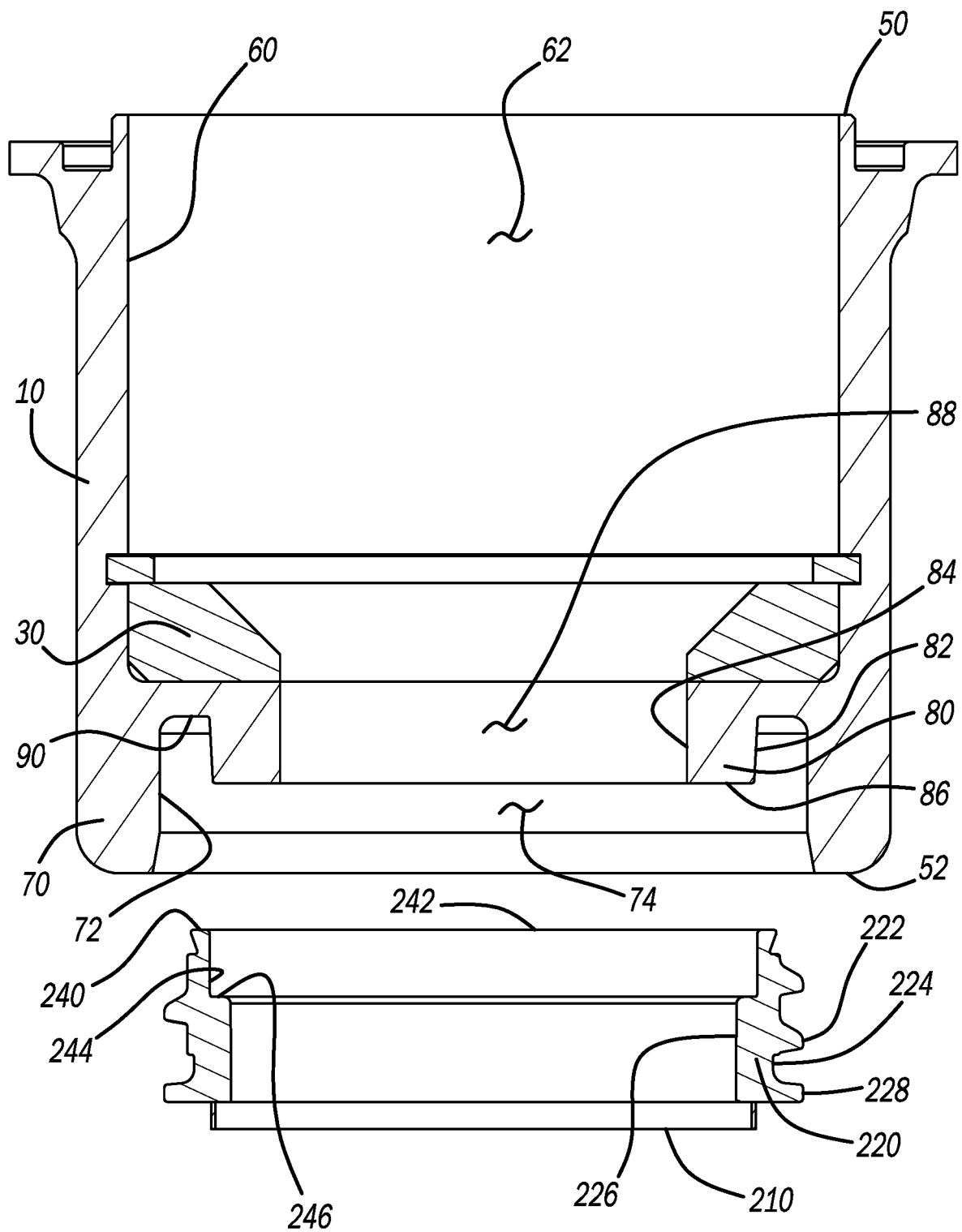
FIG. 2 is a cross-sectional view of the preform finish and the nozzle of FIG. 1 spaced apart from one another.

As illustrated in FIGS. 1 and 2, the preform 210 includes a finish 220. The finish 220 includes a plurality of threads 222 configured for securing any suitable closure to the finish 220. The threads 222 are arranged about an outer surface 224, which is opposite to an inner surface 226. Also at the outer surface 224 is a support flange 228.

The finish 220 further includes a brim 240, which is an annular sealing surface defining an opening 242 of the finish 220, which is ultimately an opening of the container formed from the preform 210. The opening 242 may have any suitable size, such as 48 mm. Extending inward from the brim 240 is an inner sealing sidewall 244. The inner sealing sidewall 244 extends to a sealing ledge 246. The sealing ledge 246 extends generally perpendicular to the inner sealing sidewall 244, and generally perpendicular to a longitudinal axis extending through a radial center of the finish 220. In the example of FIGS. 1, 2, and 3, the sealing ledge 246 is planar, or generally planar.

During the forming and filling of the container from the preform 210, the preform 210 is moved into cooperation with the nozzle 10. Specifically, the preform 210 is arranged such that the finish 220 is between the outer flange 70 and the inner flange 80. The finish 220 seals to the nozzle 10 through cooperation between the following surfaces: (1) the brim sealing surface 240 and the upper sealing surface 90; (2) the sealing ledge 246 and the lower sealing surface 86; and (3) the inner sealing sidewall 244 and the outer sealing surface 82. These three seals advantageously prevent product from leaking as it is injected through the nozzle 10 into the preform 210 to form and fill the container with the suitable product. In addition to sealing against finish 220, the inner flange 80 advantageously acts as a ferrule, and prevents the finish 220 from deflecting as the preform 210 is formed into the container and filled with product.

Figure 4:
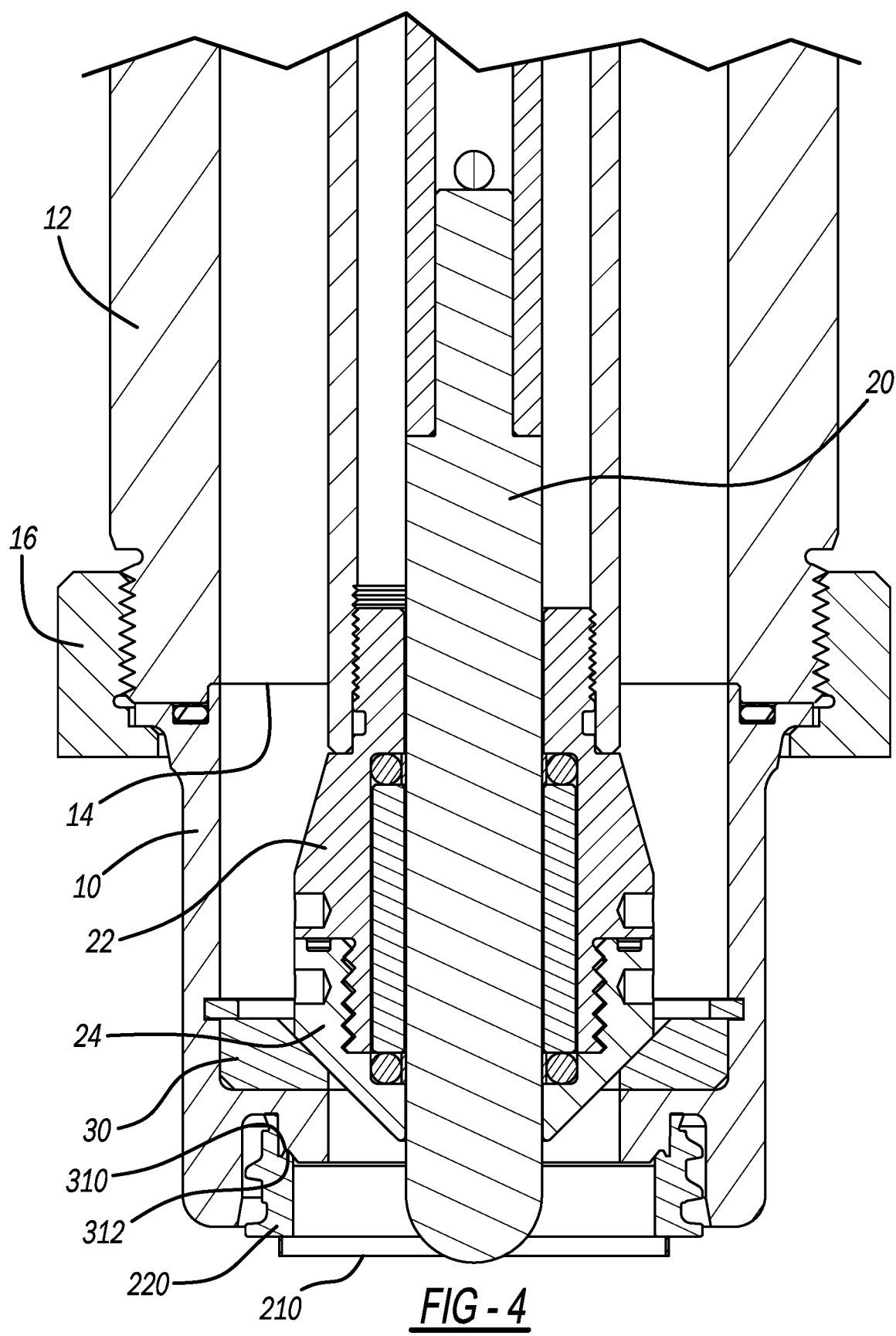
FIG. 4 is a cross-sectional view of cooperation between another container preform finish and nozzle in accordance with the present disclosure.
Figure 5:
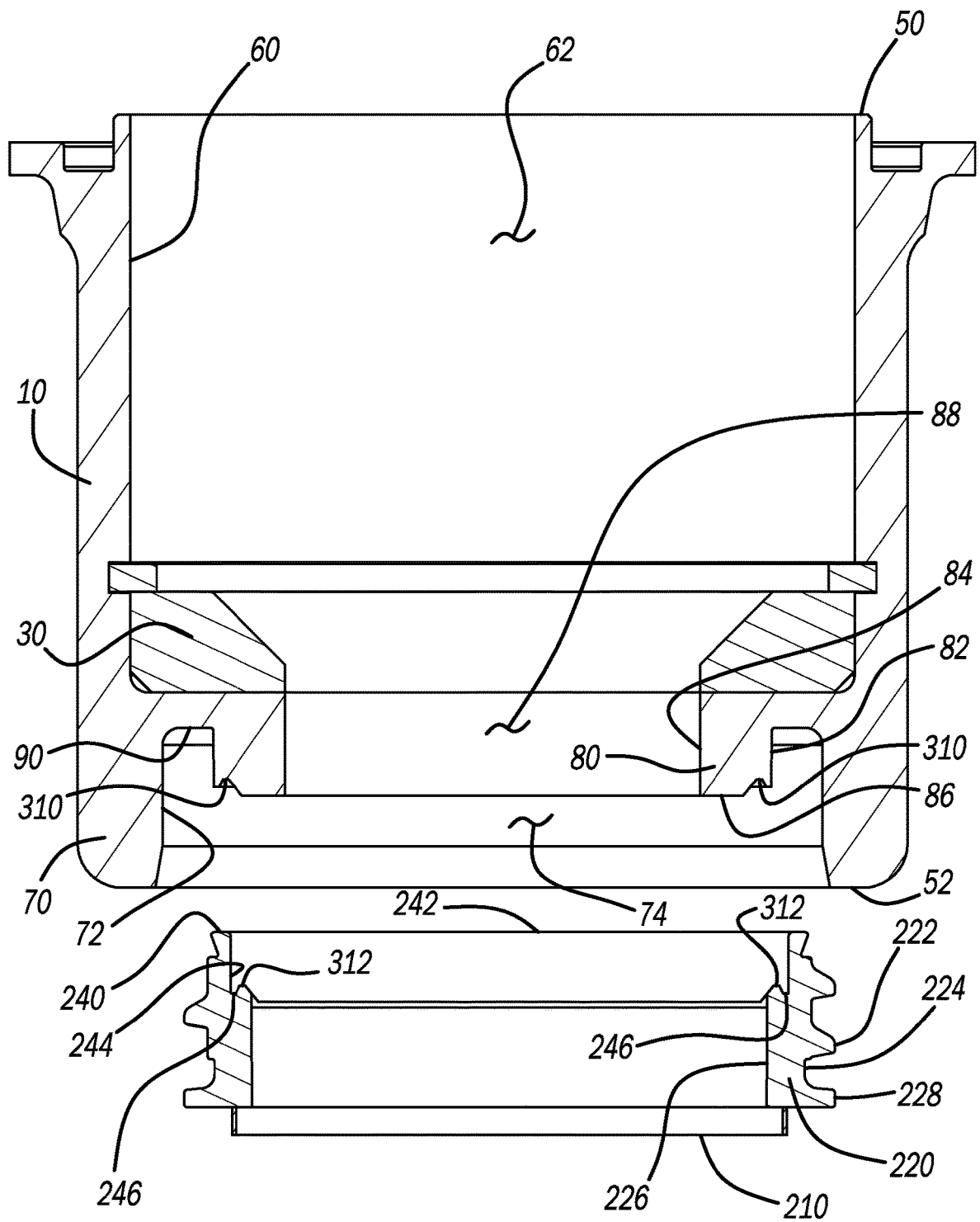
FIG. 5 is a cross-sectional view of the preform finish and the nozzle of FIG. 4 spaced apart from one another.
Figure 6:
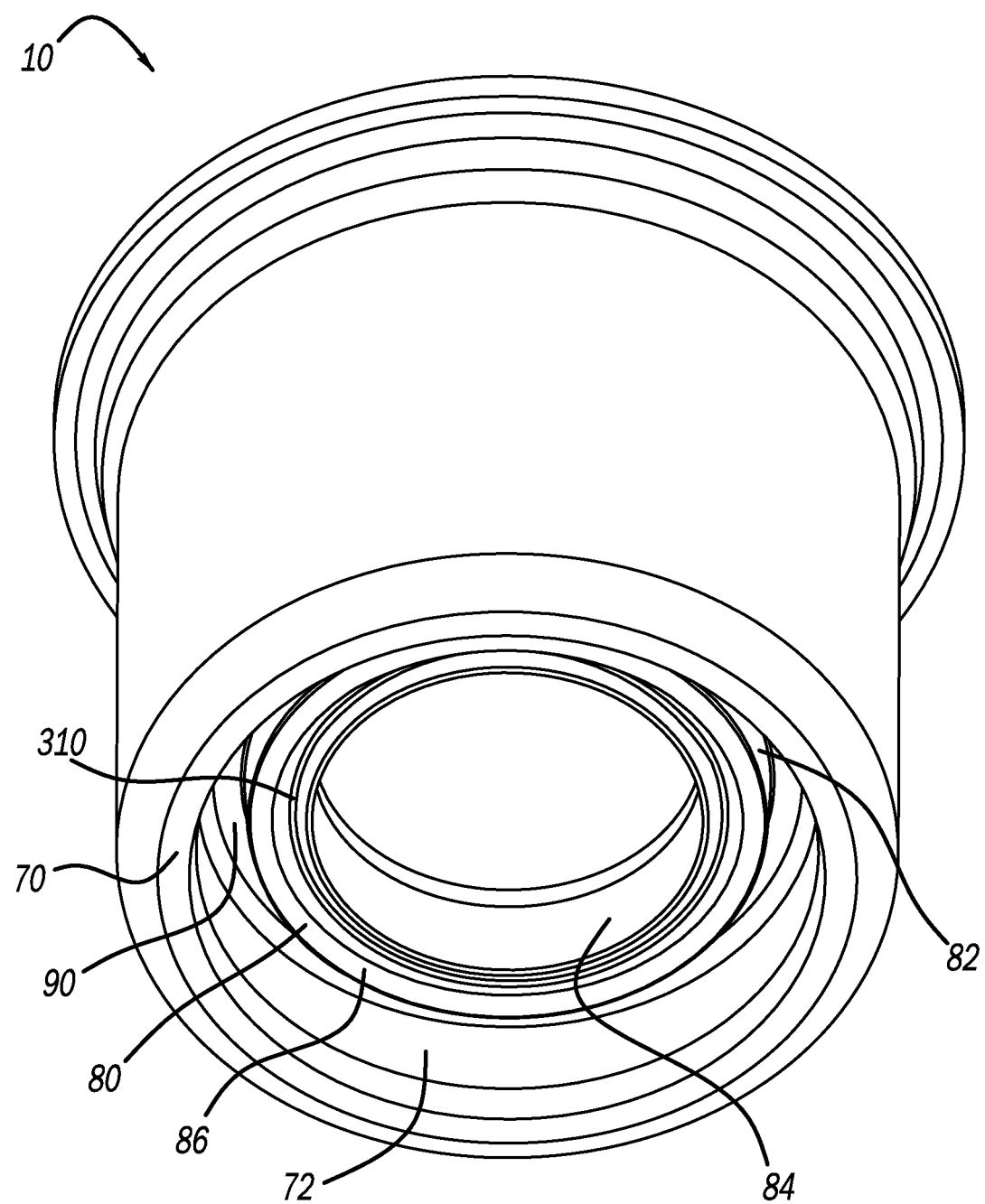
FIG. 6 is a perspective view of an undersurface of the nozzle of FIG. 4.

With reference to FIGS. 4, 5, and 6, the lower sealing surface 86 of the nozzle 10, and the sealing ledge 246 of the finish 220, may include various additional structural features to enhance the seal therebetween. For example, the sealing ledge 246 may include a preform notch or curved surface 312, which is sized and shaped to cooperate with a nozzle notch or curved surface 310 at the lower sealing surface 86.

The present disclosure advantageously provides an improved seal between the finish 220 and the nozzle 10 to prevent leakage of product flowing from the nozzle 10 into the preform 210. The improved seal also maintains pressure on the container during forming and improves definition in the container after forming.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A nozzle for a forming/filling head configured to inject a product into a thermoplastic preform sealed to the nozzle for simultaneously forming a container from the thermoplastic preform and filling the container with the product, the nozzle comprising:
   an outer flange at an outlet of the nozzle;
   an inner flange surrounded by the outer flange, the inner flange including an outer sealing surface facing the outer flange, an inner surface opposite to the outer surface, and a lower sealing surface; and
   an upper sealing surface between the outer flange and the inner flange;
   wherein upon insertion of a finish of the thermoplastic preform between the outer flange and the inner flange, the nozzle seals to the thermoplastic preform through cooperation between: the upper sealing surface and a brim of the thermoplastic preform; the lower sealing surface and a sealing ledge of the thermoplastic preform; and the outer sealing surface and an inner sealing sidewall of the thermoplastic preform.

2. The nozzle of claim 1, wherein the inner flange is an annular flange defining an intermediate portion of an aperture extending through the nozzle.

3. The nozzle of claim 2, wherein the outer flange is an annular flange defining a downstream portion of an aperture extending through the nozzle.

4. The nozzle of claim 1, wherein the outer flange and the inner flange are configured to accommodate therebetween the finish having a diameter of 48 mm.

5. The nozzle of claim 1, wherein the lower sealing surface of the inner flange is planar.

6. The nozzle of claim 1, wherein the lower sealing surface includes a nozzle notch configured to seal with a preform notch at the sealing ledge of the thermoplastic preform.

7. The nozzle of claim 1, wherein cooperation between the outer sealing surface of the inner flange and the inner sealing sidewall of the finish restricts deflection of the finish during forming/filling of the container.

8. The nozzle of claim 1, wherein an inlet end of the nozzle is configured to be secured to the forming/filling head, the inlet end and the outer flange are at opposite ends of the nozzle.

9. A system for simultaneously forming a container and filling the container with a product, the system comprising:
   a thermoplastic preform configured to be molded into the container, the thermoplastic preform including a finish comprising:
      a brim defining an opening;
      threads at an outer surface, the threads configured to cooperate with a closure;
      a sealing ledge at an inner surface, the inner surface is opposite to the outer surface; and
      an inner sealing sidewall extending between the sealing ledge and the brim;
   a nozzle for a forming/filling head configured to inject the product into the thermoplastic preform sealed to the nozzle for simultaneously forming the container from the thermoplastic preform and filling the container with the product, the nozzle comprising:
      an outer flange at an outlet of the nozzle;
      an inner flange surrounded by the outer flange, the inner flange including an outer sealing surface facing the outer flange, an inner surface opposite to the outer surface, and a lower sealing surface; and
      an upper sealing surface between the outer flange and the inner flange;
   wherein upon insertion of the finish between the outer flange and the inner flange of the nozzle, the finish seals to the nozzle through cooperation between: the brim and the upper sealing surface of the nozzle between the outer flange and the inner flange; the sealing ledge of the finish and the lower sealing surface of the inner flange of the nozzle; and the inner sealing sidewall of the finish and the outer sealing surface of the inner flange of the nozzle.

10. The system of claim 9, wherein the sealing ledge of the finish is planar and the lower sealing surface of the nozzle is planar.

11. The system of claim 9, wherein the sealing ledge of the finish has a preform notch and the lower sealing surface of the nozzle has a nozzle notch;
   wherein the preform notch is configured to cooperate with the nozzle notch to seal the preform notch to the nozzle notch.

12. The system of claim 9, wherein the opening has a diameter of 48 mm.

13. The system of claim 9, wherein the inner sealing sidewall of the finish extends generally perpendicular relative to the sealing ledge.

* * * * *